(12) United States Patent
Ogle et al.

(10) Patent No.: US 7,757,120 B2
(45) Date of Patent: Jul. 13, 2010

(54) IGNORING REDUNDANT SYMPTOMS IN MODULAR SELF-HEALING SYSTEMS

(75) Inventors: David M. Ogle, Cary, NC (US); Balan Subramanian, Cary, NC (US); Brad B. Topol, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 11/426,288

(22) Filed: Jun. 23, 2006

(65) Prior Publication Data

US 2007/0299943 A1    Dec. 27, 2007

(51) Int. Cl.
G06F 11/00 (2006.01)
(52) U.S. Cl. .......................................... 714/26; 714/25
(58) Field of Classification Search .................... 714/25, 714/26

See application file for complete search history.

(56) References Cited

U.S. PATENT DOCUMENTS

| 5,483,637 | A  | * | 1/1996 | Winokur et al. ............... 714/26 |
| 5,528,516 | A  | * | 6/1996 | Yemini et al. ............... 702/181 |
| 5,539,877 | A  |   | 7/1996 | Winokur et al. ............... 714/26 |
| 5,790,779 | A  |   | 8/1998 | Ben-Natan et al. ............ 714/39 |
| 6,006,016 | A  | * | 12/1999 | Faigon et al. .................. 714/48 |
| 6,061,723 | A  | * | 5/2000 | Walker et al. ............... 709/224 |
| 6,832,341 | B1 | * | 12/2004 | Vijayan ....................... 714/43 |
| 7,043,659 | B1 | * | 5/2006 | Klein et al. ..................... 714/4 |
| 7,293,201 | B2 | * | 11/2007 | Ansari ......................... 714/38 |
| 7,529,974 | B2 | * | 5/2009 | Thibaux et al. ............... 714/26 |
| 2002/0007468 | A1 |  | 1/2002 | Kampe et al. |
| 2002/0116248 | A1 |  | 8/2002 | Amit et al. |
| 2002/0144177 | A1 |  | 10/2002 | Kondo et al. |
| 2002/0184065 | A1 |  | 12/2002 | Menard et al. |
| 2008/0168308 | A1 | * | 7/2008 | Eberbach et al. .............. 714/26 |

* cited by examiner

*Primary Examiner*—Philip Guyton
(74) *Attorney, Agent, or Firm*—Stephen Calogero; Law Office of Jim Boice

(57) ABSTRACT

Techniques for processing events in a self-healing system. In one embodiment, the system receives system events, one or more of which may indicate a possible fault condition in the system. A hierarchal rule structure is used to generate a correlated event set. A determining operation determines at least one corrective action to be performed in response to the correlated event set. A deactivating operation deactivates all correlation rules within the hierarchal rule structure that are only used to generate the correlated event set. Repeated instances of the same fault condition are prevented from being processed by the self-healing system.

24 Claims, 6 Drawing Sheets

IGNORING REDUNDANT SYMPTOMS IN MODULAR SELF-HEALING SYSTEMS

BACKGROUND OF THE INVENTION

The present invention relates generally to self-healing systems. More specifically, the invention relates to a method of ignoring redundant symptoms in self-healing systems which use a correlation engine and an analysis engine to diagnose and resolve fault conditions within the system.

Autonomic computing systems, also known as self-healing systems, are computing systems which incorporate knowledge about how to diagnose and repair faults occurring within themselves. In many such systems, this knowledge may consist of rules which define a variety of observable phenomena within the system. For each such observable phenomenon which is deemed harmful, the rules may further prescribe a specific corrective action. Autonomic systems may also incorporate non-rule-based techniques, including probabilistic algorithms and artificial intelligence.

Self-healing ability is beneficial for many reasons. It is frequently impractical for humans to monitor manually a system at all hours. Even when the resources exist to do so, human involvement inherently incurs the risk of human error. Moreover, some systems are so complex that no single human being understands every part of the system sufficiently to be able to correct all possible fault conditions. By contrast, self-healing methods may detect and correct faults over arbitrarily large systems.

Many autonomic computing systems known in the art incorporate two primary components: a correlation engine and an analysis engine. The correlation engine receives a stream of events, each representing an observable phenomenon which recently occurred within the system. For example, the failure of an attempt to connect to a database may constitute an event. A single event may independently represent a fault condition requiring corrective action. More frequently, however, a fault condition is detected based on multiple related events. Thus, the correlation engine may apply rules to correlate events into sets of events which, as a group, may represent a fault condition. Such sets are known in the art as "correlated event sets." It is noted that a correlated event set need not represent a fault condition with certainty. For example, the correlated event set may represent a substantial probability of a fault, with further analysis required to positively determine whether or not a fault has occurred. Thus, when a correlated event set is determined, the correlation engine forwards it to the analysis engine.

The analysis engine determines which corrective action, if any, should be taken in response to the correlated event set provided by the correlation engine. For example, in response to a correlated event set specifying that a database connection failed, the analysis engine may determine that the database crashed. It may, as a result, restart the database server.

In modular self-healing systems, the correlation engine and analysis engine are typically independent of each other. Each engine typically does not have any knowledge about the workings of the other engine. Furthermore, the two engines typically have limited communication with each other.

BRIEF SUMMARY OF THE INVENTION

Thus, one exemplary aspect of the present invention is a self-healing system. The system includes an event bus configured to transmit events in the self-healing system. A correlation engine is coupled to the event bus and is configured to correlate events transmitted on the event bus into a correlated event set. The correlated event set indicates a possible fault condition in the system. The correlation engine is further configured to evaluate a plurality of correlation rules that arranged in a hierarchal rule structure to correlate the events.

An analysis engine is also coupled to the event bus and is configured to perform analysis on the correlated event set, determine at least one corrective action to be performed in response to the correlated event set, and send a deactivate event to the correlation engine upon initiation of the corrective action. The deactivate event includes the correlated event set. The correlation engine is further configured to deactivate all correlation rules within the hierarchal rule structure that are used to generate only the correlated event set until one or more reactivation events are received by the correlation engine.

Another exemplary aspect of the invention is method for processing events in a computer system. The method includes a receiving operation for receiving at least one system event. The system event may indicate a possible fault condition in the system and the method uses a hierarchal rule structure to generate a correlated event set. A determining operation determines at least one corrective action to be performed in response to the correlated event set. A deactivating operation deactivates all correlation rules within the hierarchal rule structure that are only used to generate the correlated event set.

Yet a further exemplary embodiment of the invention is a computer program product for processing events in a computer system. The computer program product includes computer usable program code configured to receive at least one system event, utilize a hierarchal rule structure to generate a correlated event set, determine at least one corrective action to be performed in response to the correlated event set, and deactivate all correlation rules within the hierarchal rule structure that are only used to generate the correlated event set.

DETAILED DESCRIPTION OF THE INVENTION

Figure 1:
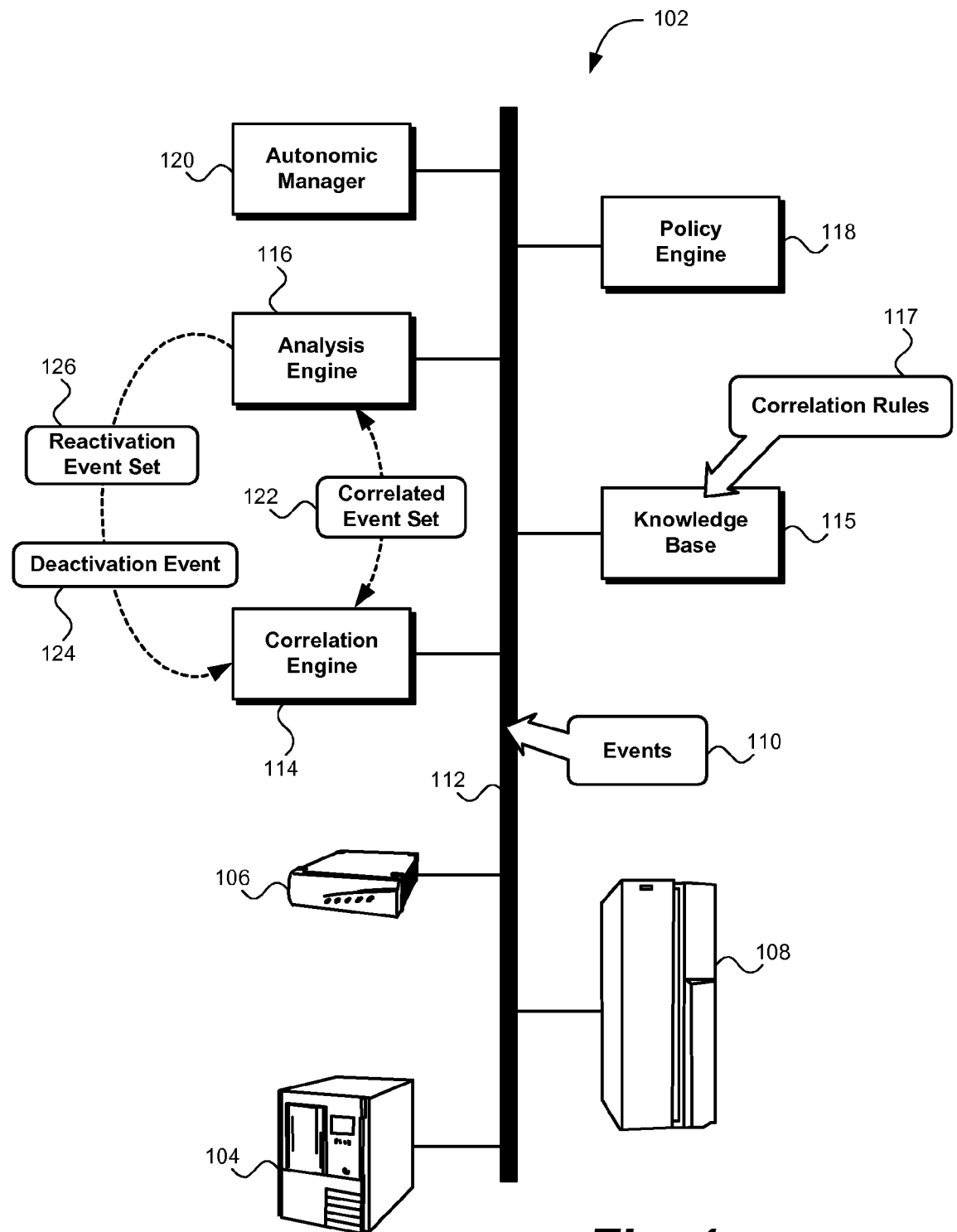
FIG. 1 shows an exemplary self-healing system embodying the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The following description details how the present invention is employed to ignore redundant symptoms in modular self-healing systems. Concepts of the invention are illustratively described in a self-healing system architecture that uses a correlation engine and an analysis engine to diagnose and resolve fault conditions within the system. Nevertheless, it is understood that the inventive concepts described herein may be applied in other system architectures. Throughout the description of the invention reference is made to FIGS. 1-5. When referring to the figures, like structures and elements shown throughout are indicated with like reference numerals.

FIG. 1 shows an exemplary self-healing system embodying the present invention. The self-healing system 102 may assume any of a wide variety of forms. It may be designed to accomplish any of a variety of goals. The system may incorporate any of a variety of technological components known to those skilled in the art, such as computing systems 104, network devices 106, data storage devices 108, etc.

The components 104, 106, 108 of the self-healing system 102 may, from time to time, report data about their state. They may do so by sending information to "listeners", components which monitor the state of other system components. Additionally, a listener may request state data from another component. In an embodiment of the present invention, listeners are implemented as web services. When the state data represents a noteworthy phenomenon, an event 110 may be transmitted via an event bus 112. In one embodiment of the present invention, the event 110 is transmitted directly to a correlation engine 114.

In an embodiment of the present invention, events are processed using the Common Event Infrastructure (CEI) developed by International Business Machines Corporation located in Armonk, N.Y. The CEI is an implementation of a consistent, unified set of application protocol interfaces (APIs) and infrastructure for the creation, transmission, persistence and distribution of a wide range of business, system and network events. Events 110 may be implemented as Common Base Events, the core element of the CEI. In a further embodiment of the present invention, Generic Log Adapters, a feature of the CEI, may be used to convert log files generated by the listener web services into Common Base Events.

The correlation engine 114 may receive events 110 by listening to an event bus 112. The correlation engine 114 may utilize rule-based algorithms to correlate the incoming events into sets of events which, as a group, may represent a possible fault condition. These sets of events are referred to herein as a correlated event set 122. In one embodiment of the invention, correlation rules 117 utilized by the correlation engine 114 are stored in a knowledge base 115 in eXtensible Markup Language (XML) form. The correlation rules 117 are loaded by the correlation engine 114 and converted into internal data structures.

As discussed in more detail below, the correlation rules 117 can describe a complex sequence of events. For example, the correlation rules 117 may report two events occurring in sequence within a given time cap between them. In addition, correlation rules may feed other correlation rules to create a hierarchal rule structure.

The analysis engine 116 receives correlated event sets 122 (directly or indirectly) from the correlation engine 114 by listening to the event bus 112. It is noted that an analysis engine may be referred to in the art as a symptom service. It is emphasized that the analysis engine 116 is typically unaware of the implementation details of the correlation engine 114. For example, the analysis engine 116 may be unaware of what rules were responsible for generating the correlated event set 122.

The analysis engine 116 may incorporate logic to analyze the correlated event set 122. Such logic may be stored in the knowledge base 115 and accessed by the analysis engine 116 by looking up the correlated event set. The analysis engine 116 may use any other mode of analysis to determine the implications of the correlated event set 122. For example, the analysis engine 116 may utilize embedded knowledge to determine whether or not the correlated event set indicates a fault condition.

The analysis engine 116 typically identifies one or more corrective actions to be taken to attempt to correct the fault condition. The analysis engine 116 may also consult a policy engine 118 to determine whether a given fault should be corrected. The policy engine 118 may be part of the analysis engine, may be located elsewhere in the self-healing system 102 or may be external to the system entirely. It is noted that the analysis engine 116 may not take any corrective action in response to the fault condition.

Consider, for example, a website which, because of a failure, becomes unavailable at 3 AM. A correlated event set is transmitted to the analysis engine 116 by the correlation engine 114 to advise it of the downtime. However, the policy engine 118 determines that the website is not required to be available between 1 AM and 5 AM. Such a business rule may be due to scheduled downtime or may simply reflect the fact that corrective action is not worth the resources required to make the website available at such hours. Even though the analysis engine 116 determines that the website has a fault, it takes no corrective action due to the policy.

If the correlated event set 122 is determined to represent a fault condition, and if it is not contrary to policy to correct the fault condition, the identified corrective action(s) to correct the fault condition are initiated by the analysis engine 116. In an embodiment of the present invention, the analysis engine 116 itself effects the corrective actions. In another embodiment of the present invention, the analysis engine 116 passes the corrective actions to another system component, such as an autonomic manager 120, which in turn effects the corrective actions.

It is emphasized that a corrective action may not, and may not be expected to, immediately resolve the fault condition. For example, if it is determined that a server must be rebooted, the reboot process may take several seconds or even minutes. Also, a corrective action may involve modifying a configuration setting by a fixed amount or percentage, waiting to see if the fault condition still exists, and iteratively repeating such modification until the fault condition is resolved. In such cases, a time lag after the corrective action may be inherently necessary to evaluate whether the fault condition was in fact resolved.

During any gap in time between commencing a corrective action and successfully resolving the fault condition, incoming events signifying the problem may still be present. Thus, the correlation engine 114 may still continue to process the incoming events and report the correlated event set being resolved by the analysis engine 116. Because the correlated event set may be reported multiple times per second, and because the time required to correct the fault condition may be substantial, it is possible in practice for a correlated event set representing a single fault condition to be repeated thousands of times.

To prevent this behavior, when the analysis engine 116 begins responding to a correlated event set 122, it may send a request to discontinue reporting that correlated event set until further notice by sending a deactivation event 124 to the correlation engine 114. The deactivation event 124 may include the correlated event set 122 in its entirety. It may also incorporate the correlated event set 122 by reference, such as by specifying a unique identifier. In an embodiment of the present invention, this request is a Common Base Event as defined by the Common Event Infrastructure.

The correlation engine 114 receives the deactivation event 124. It may respond by performing internal configuration measures to block the reporting of the correlated event set 122 referred to by the deactivation event 124. In a rule-based correlation engine 114, these measures may include deactivating the rules that directly drive the correlated event set. As used herein, deactivated rules are rules that are not evaluated by the correlation engine 114. The measures may furthermore include deactivating any rules which, while not directly triggering the correlated event set 122, can have no indirect effect other than to trigger the correlated event set 122. Repeated instances of the same fault condition are not unnecessarily processed by the correlation engine 114.

A new rule called, for example, "$R_{activate}$", may be created. In an embodiment of the present invention, the rule is created by the correlation engine 114 itself. In another embodiment of the present invention, the rule is created by a bridge class that connects the correlation engine 114 to another module in the system 102, such as the analysis engine 116 or the autonomic manager 120. When invoked by one or more reactivation events, the rule "$R_{activate}$" causes the deactivated rules related to this correlated event set to return to their active state. As used herein, active rules are rules that are evaluated by the correlation engine 114.

In a particular embodiment of the invention, the analysis engine 116 is configured to send a reactivation event set 126 to the correlation engine (either directly or indirectly). The reactivation event set 126 indicates one or more events required to be received by the correlation engine 114 in order to reactivate the deactivated correlation rules. When the correlation engine 114 receives this set of events, the rule $R_{activate}$ is triggered, causing the rules deactivated as described above to be reactivated. Thus, if a distinct instance of the same fault condition occurs, it will be received as a separate fault and corrected again.

Figure 2:
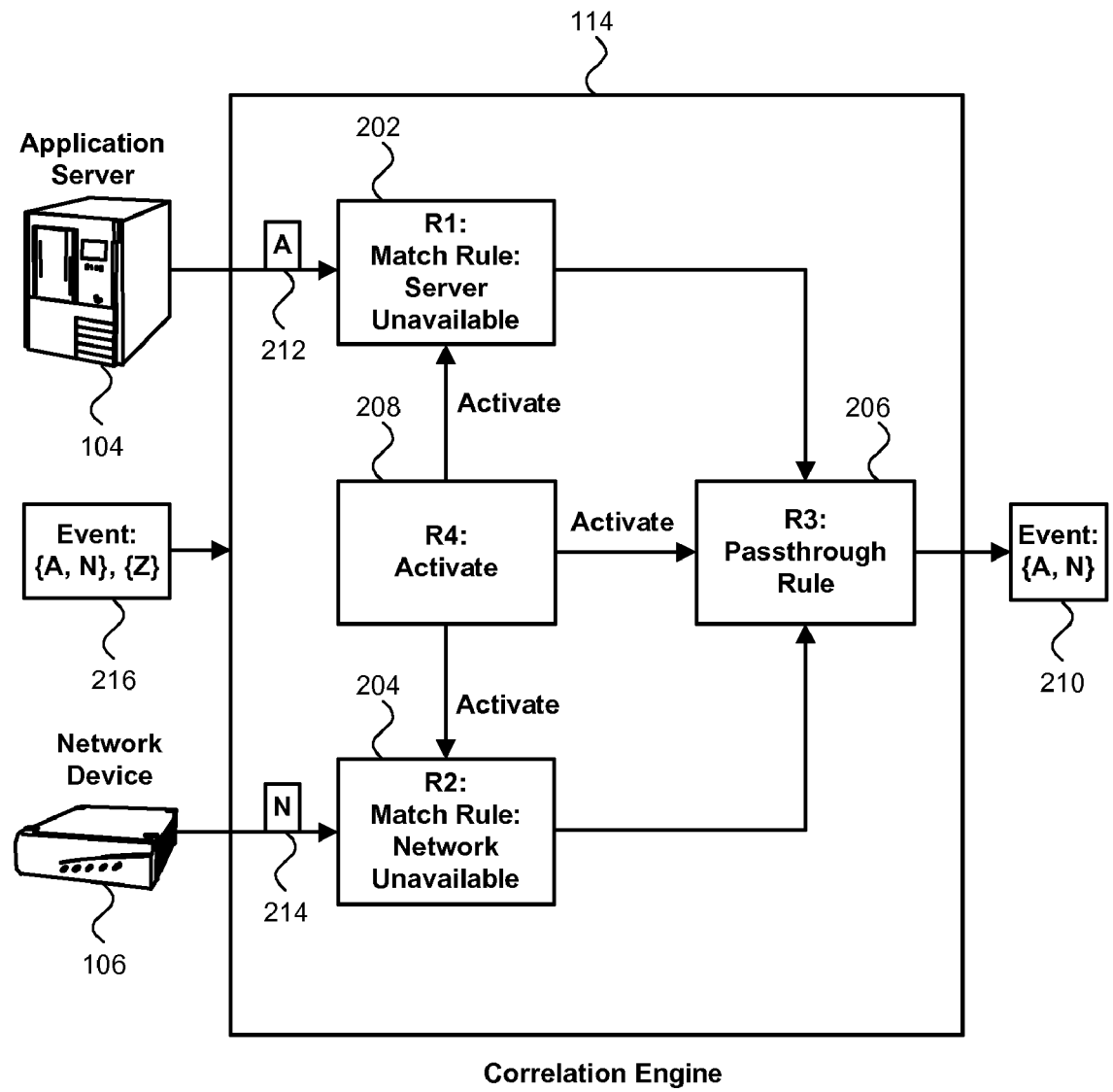
FIG. 2 illustrates the behavior of an exemplary, rule-based correlation engine embodying the present invention.

FIG. 2 illustrates the behavior of an exemplary, rule-based correlation engine 114 embodying the present invention. As shown, the correlation engine 114 receives as input events related to observed phenomena in the system environment. The correlation engine utilizes rule-based algorithms to correlate related events into correlated event sets. Each rule has an action handler, a condition specifying when that rule is triggered. A rule may depend on observed phenomena. For example, a rule "R7" may be triggered if event "E" has been observed. Rules of this nature may be referred to as "match" rules. A rule may also depend on other rules. For example, a rule "R10" may be triggered if and only if rules "R8" and "R9" have both triggered. It is noted that rule R10 in this example is analogous to an AND Boolean operation or an AND gate in hardware-based systems. If triggering is Boolean True and not triggering is Boolean False, then R10 equals R8 AND R9. A rule may also specify that when triggered, the events triggering that rule are packaged into a correlated event set and forwarded (directly or indirectly) to the analysis engine. Rules of this nature may be referred to as "passthrough" rules or "end" rules.

The exemplary autonomic system incorporates an application server 104. The application server 104 may become unavailable for a variety of reasons. One possibility is that the server 104 may have crashed, requiring a reboot in order to operate again. Another possibility is that the application server 104 is working properly, but a network connection failure prevents contacting the application server 104. It is emphasized that because there are multiple possible causes, unavailability of the application server 104 in and of itself is insufficient to diagnose the problem. If the application server 104 becomes unavailable, an event "A" 212 may be sent to the correlation engine 114. A match rule "R1" 202 is triggered if and only if event A 212 has been observed.

The exemplary autonomic system is also connected to a network. The network device 106 may become unavailable, again for a variety of reasons. Most networks incorporate methods to confirm the availability of the network itself, independently of any individual system accessible via the network. If usage of such a method yields a determination that the network connection is unavailable, an event "N" 214 is sent to the correlation engine 114. Another match rule, "R2" 204, is triggered if and only if event N has been observed.

The application server 104 and the network device 106 both being unavailable leads to the inference that the network connection to the application server 104 is broken. Therefore, passthrough rule "R3" 206 is triggered if and only if both rule R1 202 and rule R2 204 are triggered. Being a passthrough rule, rule R3 packages events A 212 and N 214 into a correlated event set 210. The correlation engine 114 forwards this correlated event set 210 to the analysis engine via an event.

The analysis engine receives the correlated event set 210 containing the events {A, N}. Upon determining the most likely cause of the system fault, it commences a corrective action by, for example, resetting the network connection to the application server. Once a corrective action is initiated for the correlated event set 210, the analysis engine does not need to see further repetitions of the correlated event set 210. However, the analysis engine cannot itself disable the correlated event set 210 because it is unaware of the artifacts used by the correlation engine 114 to correlate incoming events. Instead, the analysis engine sends a deactivation event 216 to the correlation engine 114. The deactivation event 216 contains the correlated event set {A, N}. It also specifies a second event, "Z", which when transmitted will signal that the fault condition indicated by the correlated event set has been resolved.

The correlation engine 114 responds to the deactivation event 216 by deactivating all correlation rules within the hierarchal rule structure that are only used to generate the correlated event set {A, N}. Deactivating a rule may be effected by any method which causes that rule not to be processed. Rule R3 206 directly drives the correlated event set. Therefore, the correlation engine deactivates rule R3. Rule R1 202 is also only used to generate the correlated event set {A, N}, because the only rule it influences is being ignored. Therefore, the correlation engine also deactivates rule R1 202. Similarly, rule R2 204 is only used to generate the correlated event set {A, N}, because it too can only influence a deactivated rule. Therefore, the correlation engine 114 also deactivates rule R2 204. Rules R1 202, R2 204 and R3 206 are deactivated by this process. As a result, the correlated event set will not be redundantly reported and rules solely devoted to generating the correlated event set will not be unnecessarily evaluated at the correlation engine 114.

In an embodiment of the present invention, generation of events which trigger only deactivated rules are disabled entirely. The correlation engine 114 is therefore configured to disable transmission of a component event from the system component 104, 106 upon a determination that the component event is only processed by disabled rules. In this example, transmission of event A 212 would be disabled because it can only influence the deactivated rule R1 202. Likewise, transmission of event N 214 would be ceased because it can only influence the deactivated rule R2 204.

The correlation engine 114 also creates an activation rule "R4" 208. Rule R4 awaits for the specified event Z, triggering if and only if that event is observed. When triggered, Rule R4 is programmed to reactivate the deactivated rules R1 202, R2 204 and R3 206. If the events A 212 and N 214 are disabled as described above, they too resume being transmitted. It is noted that event set {Z} represents a simple reactivation event set. The reactivation event set indicates one or more reactivation events required to be received by the correlation engine to reactivate the deactivated correlation rules.

In one embodiment of the invention, the events defined in the reactivation event set originate from system components, such as the application server 104 and the network device 106. In another embodiment of the invention, when the network connection has been successfully restored, the analysis engine sends event Z to the correlation engine 114. This causes rule R4 to become True. As a result, rules R1 202, R2 204 and R3 206 and possibly the events A and N are reactivated. Thus, if the network connection to the application server fails again, the new, separate fault condition will again be reported as a correlated event set.

Figure 3:
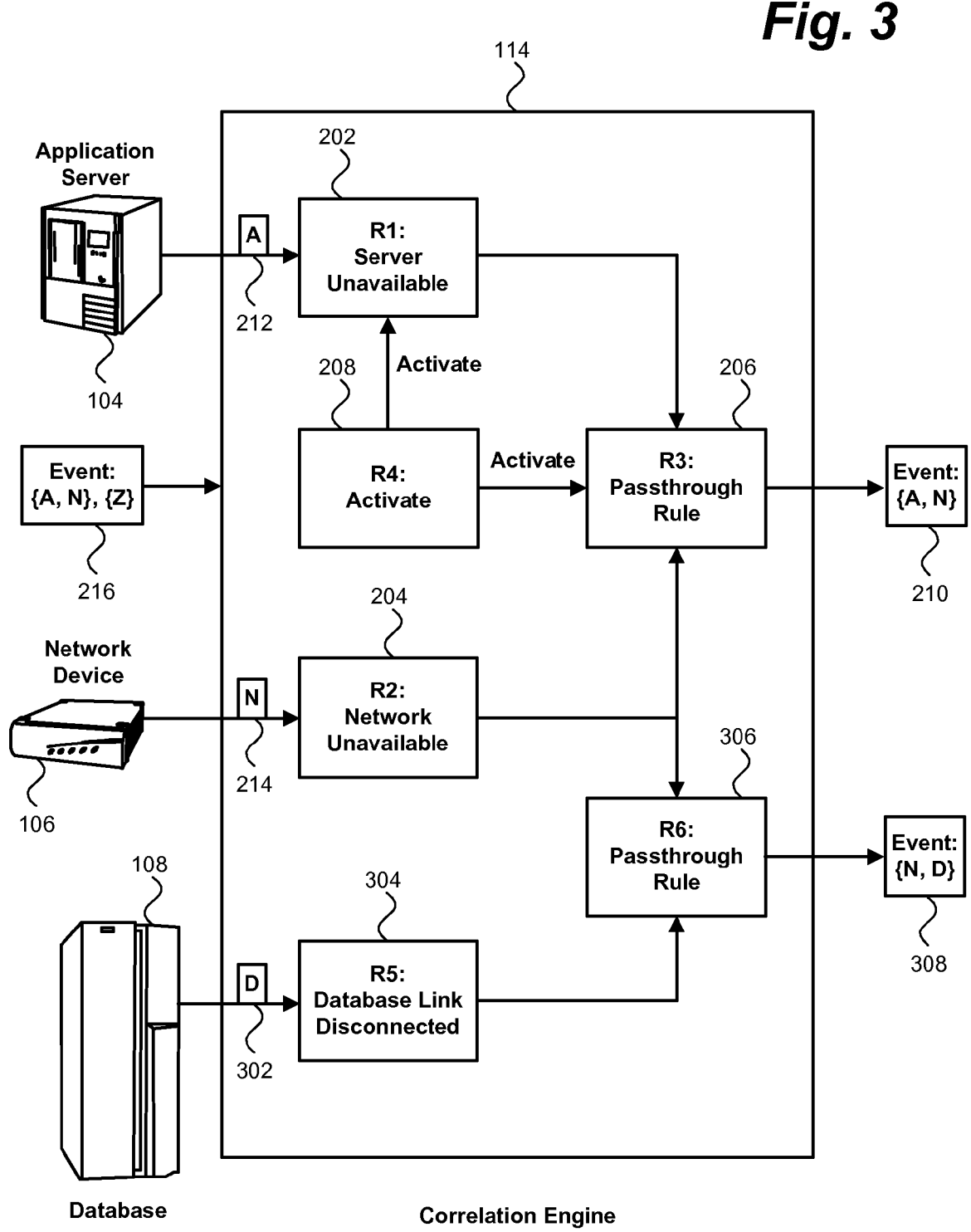
FIG. 3 illustrates the behavior of another exemplary, rule-based correlation engine embodying the present invention.

Turning now to FIG. 3, a database 108 is added to the exemplary autonomic system. The database 108 may become unavailable for a variety of reasons. For example, if the storage medium used by the database 108 crashes, the database 108 may become unable to process queries. Alternatively, the database 108 may be working properly, but a network connection failure may be preventing making connections to it. As with the application server 104, because there are multiple possible causes, unavailability of the database 108 in and of itself is insufficient to diagnose the problem. If the database 108 becomes unavailable, an event "D" 302 may be sent to the correlation engine 114. A match rule "R5" 304 is triggered if and only if event D 302 has been observed.

The database 108 and the network device 106 both being unavailable leads to the inference that the network connection to the database 108 is broken. Therefore, passthrough rule "R6" 306 is triggered if and only if both rule R2 204 and rule R5 304 are triggered. Being a passthrough rule, rule R6 306 packages events N 214 and D 302 into a correlated event set. It transmits this correlated event set directly or indirectly to the analysis engine via an event 308.

Consider again the original example in which the application server 104 is unavailable due to a network connection failure. As before, the correlation engine 114 determines the correlated event set {A, N} and transmits it to the analysis engine. The analysis engine again receives this correlated event set and commences the appropriate corrective action. As before, it sends an event 216 to the correlation engine 114, containing the correlated event set {A, N} and specifying the reactivating event set {Z} that will indicate successful restarting of the network connection.

The correlation engine 114 again responds to the event 216 by deactivating the rules which drive the correlated event set {A, N}. As before, it deactivates rule R3 206 because it directly drives this correlated event set. Rule R1 202 still has no other possible effect, because the only rule it influences is still being ignored. Therefore, the correlation engine again deactivates rule R1 202. However, rule R2 204 now drives not only the deactivated rule R3 206 but also the active rule R6 306. Deactivating rule R2 204 would be harmful because it would prevent rule R6 306 from being triggered, thus preventing database unavailability due to a network connection failure from being recognized and from being reported as the correlated event set {N, D}. Therefore, the correlation engine 114 does not deactivate rule R2 204. Only rules R1 202 and R3 206 are deactivated by this process.

The correlation engine 114 again creates an activation rule "R4" 208. Rule R4 awaits the specified reactivation event set {Z}, triggering if and only if that event is observed. When triggered, rule R4 208 is programmed to reactivate the deactivated rules, which this time comprise only rules R1 202 and R3 206. Rule R4 208 may contain a list of those rules which were actually deactivated as a result of the deactivation event 216. Such a list facilitates rapid reactivation of the appropriate rules.

Figure 4:
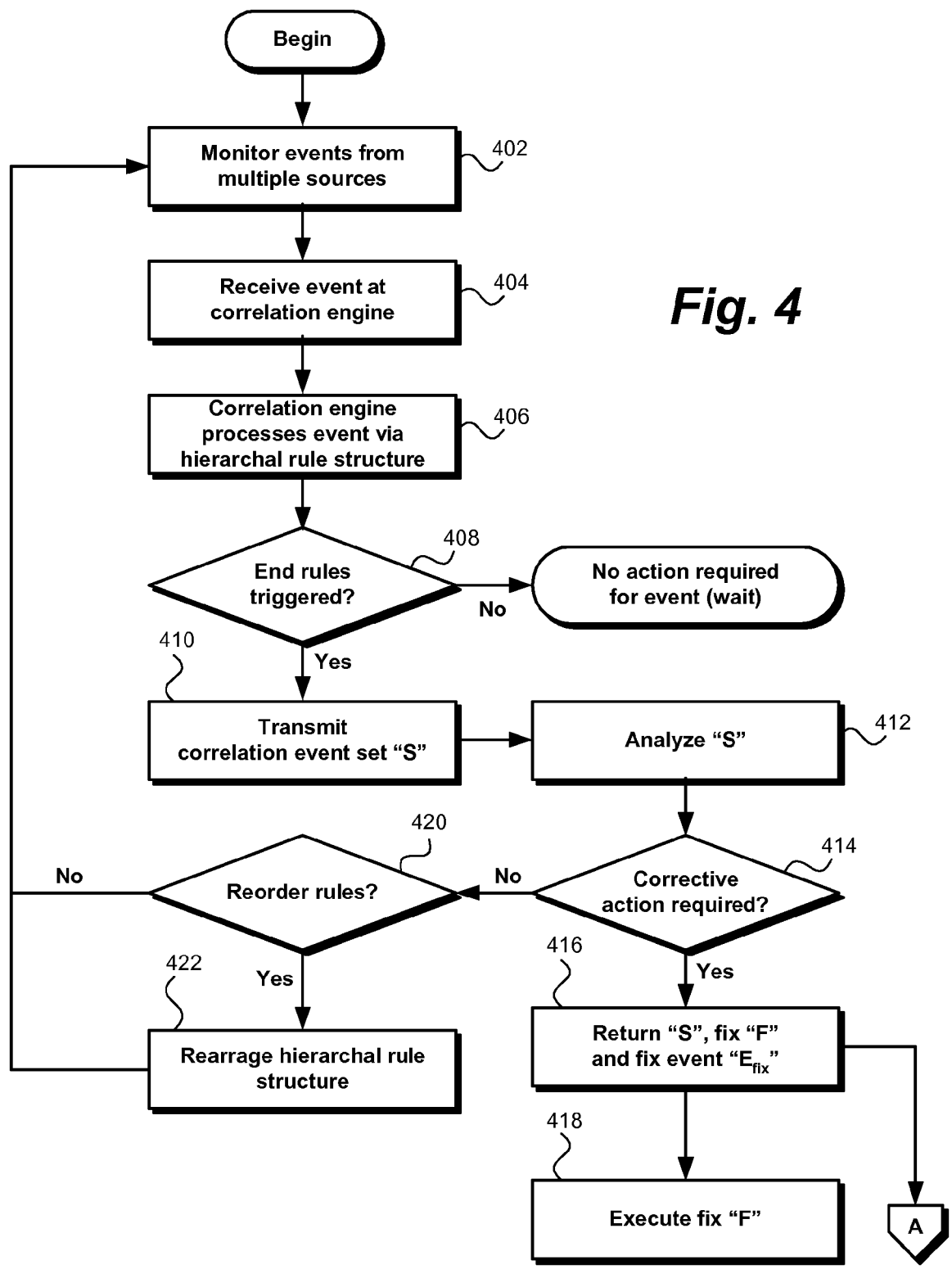
FIG. 4 shows an exemplary flowchart of the operations performed by the present invention to process an event.

Turning now to FIG. 4, an exemplary flowchart of the operations performed by the present invention to process an event is shown. The operations listed include those performed by the correlation engine, the analysis engine, as well as other parts of the autonomic system. The flowchart is generally arranged in temporal sequence, rather than by system component.

At monitoring operation 402, the system monitors multiple sources of data in order to maintain an awareness of the system state. When a noteworthy phenomenon is observed, it is reported as an event. It is contemplated that the failure of a component to report state data as expected and/or to respond to a request for state data (e.g., a "ping" request) may cause a listener to emit an event indicating that component is unavailable. In an embodiment of the present invention, the event is a Common Base Event as defined in the Common Event Infrastructure. After an event is generated during monitoring operation 402, flow passes to receiving operation 404.

At receiving operation 404, the observed event is received by the correlation engine 114. In one embodiment of the invention, the event is transmitted to the autonomic manager, which in turn retransmits the event to the correlation engine. This retransmission may be accomplished, for example, via a bridge class. It is emphasized that a wide variety of techniques may be used to report system state information to the correlation engine without departing from the scope and spirit of the present invention. After receiving operation 404 is completed, control passes to correlating operation 406.

At correlating operation 406, the correlation engine processes the incoming event using rule-based algorithms to correlate the incoming events into sets of events which, as a group, may represent a possible fault condition, as discussed above. The correlation engine may use other algorithms and/or methods known to those skilled in the art to correlate incoming events. Sets of events correlated (regardless of the algorithms used for correlation) are known in the art as "correlated event sets." After correlating operation 406 is completed, control passes to determining operation 408.

At determining operation 408, the correlation engine determines whether an end rule has been triggered. Recall that an end rule is any rule which determines that a potential problem exists and thus sends a correlated event set describing that problem. It is noted that a correlated event set may consist of only a single event. It is further noted that the correlation engine need not be absolutely certain that a given set of concurrently observed events represent a fault condition to package those events into a correlated event set. For example, if events "A", "B" and "C" observed concurrently give rise to the substantial probability but not the certainty of a fault condition, the correlation engine may deem {A, B, C} to be a correlated event set. If no end rule is triggered, the correlation engine has finished processing the current event. The correlation engine may wait for further events in this case.

If an end rule was triggered, processing continues with transmitting operation 410. At transmitting operation 410, the correlation engine forwards the correlated event set "S" to the appropriate party. The correlation engine may accomplish this goal by encapsulating the correlated event set "S" within an event (such as a Common Base Event) and placing the event on an event bus. Alternatively, the event may incorporate the correlated event set by reference using a unique identifier.

In one embodiment of the present invention, the correlation engine transmits an event encapsulating a correlated event set either to an autonomic manager or to a bridge class which connects to an autonomic manager. The autonomic manager then forwards the correlated event set to the analysis engine. It is contemplated that the correlated event set "S" will ultimately arrive at the analysis engine, regardless of any intermediate steps required or deemed appropriate in the context of a given autonomic system. After transmitting operation 410 is completed, control passes to analyzing operation 412.

At analyzing operation 412, the analysis engine receives the correlated event set "S". It analyzes "S" in an attempt to determine whether it represents a fault condition. If so, it determines an appropriate corrective action for that fault condition. The analysis engine may look up "S" in a knowledge base in order to perform the analysis. Such a knowledge base may be either internal or external to the analysis engine. The analysis engine may use any other method suitable for analyzing the correlated event set. The analysis engine may additionally consult a policy engine to ascertain whether it is necessary and appropriate to resolve the given fault condition. After analyzing operation 412 is completed, process flow continues to determining operation 414.

At determining operation 414, the analysis engine determines whether a fault condition must be corrected. If the correlated event set "S" does not indicate a fault condition, the analysis engine has finished processing the correlated event set. Likewise, if a fault condition was found but the policy engine determined that it is unnecessary or inappropriate to resolve that condition, the analysis engine has finished processing the correlated event set. In this case, the analysis engine may wait for further correlated event sets.

In another embodiment of the invention, the analysis engine is configured to notify the correlation engine of at least one target event which, if detected by the correlation engine, increases the likelihood of a fault condition in the system. In this scenario, the analysis engine determines, at determining operation 420 that a system fault is likely to occur given the events contained in the correlated event set, but no corrective action is needed yet. To help efficiently deal with the system fault if it should occur, the analysis engine sends a request to the correlation engine containing one or more target events that would trigger the expected corrective action.

The correlation engine, at rearranging operation 422, searches for rules in the hierarchal rule structure that will produce the target events and trigger the expected corrective action. The correlation engine is rearranges the hierarchal rule structure such that a target rule set of one or more target rules for evaluating the target event is given processing priority. For example, the order in which rules are iteratively evaluated at the correlation engine may be modified so that the target rules are evaluated first. Other methods known in the art for prioritizing rules may be utilized by the present invention.

Figure 5:
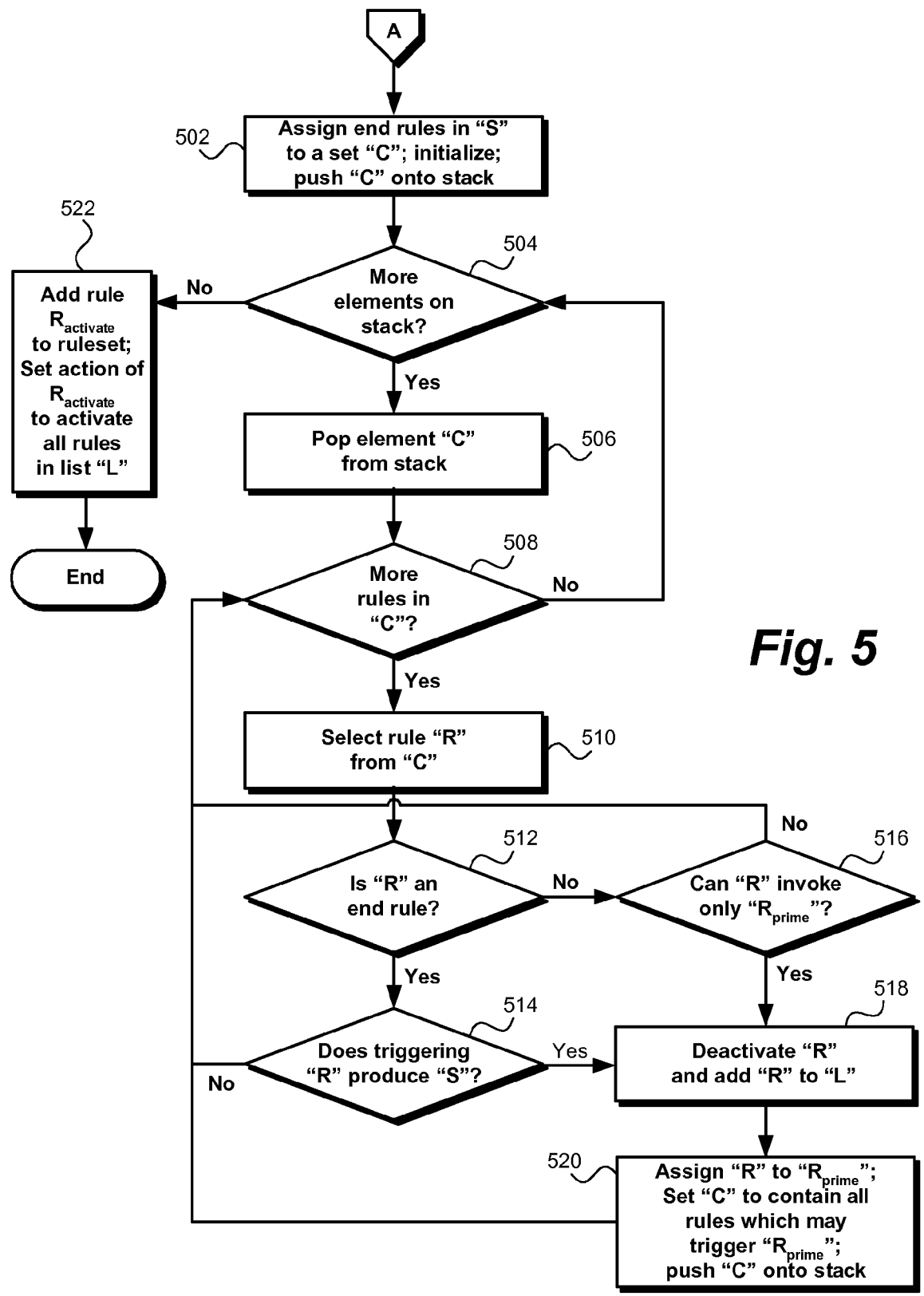
FIG. 5 shows an exemplary flowchart of the operations performed by the present invention to disable rules associated with a given correlated event set.

If, on the other hand, corrective action is necessary, processing continues with returning operation 416. The analysis engine returns the correlated event set "S", a fix "F" which is intended to resolve the fault condition, and an event "$E_{fix}$" which will indicate that the fault condition is resolved. The analysis engine may package this data into an event and send the event to an autonomic manager. The autonomic manager may then provide the correlated event set "S" and the event "$E_{fix}$" to the correlation engine for processing according to the flowchart shown in FIG. 5. In another embodiment of the present invention, the event is transmitted directly to the correlation engine and processed at the correlation engine as shown in FIG. 5. After returning operation 416 is completed, process flow continues to resolving operation 418.

At resolving operation 418, the fix "F" is applied in order to attempt to resolve the fault condition. The autonomic manager may apply the fix. Alternatively, any other system component deemed appropriate to the task may apply the fix. It is contemplated that step 418 may be performed concurrently, or approximately concurrently, with forwarding the correlated event set "S" back to the correlation engine for deactivation.

Turning now to FIG. 5, an exemplary flowchart of the operations performed by the present invention to disable rules associated with a given correlated event set is shown. The exemplary operations disable the correlated event set by deactivating the end rules which directly produce the correlated event set. Moreover, any rules which can trigger only a rule which can only produce the correlated event set are also disabled. While FIG. 5 can be considered as a self-contained process, in terms of the flow of control, it is invoked at the conclusion of returning operation 416 in FIG. 4.

At receiving operation 502, the correlation engine receives a correlated event set "S" which the analysis engine does not wish to see again until further notice. To comply with this wish, the correlation engine deactivates the rules driving S. The correlation engine determines which end rules cause S to be transmitted. Each such rule is added to a set, called "C". It is noted that only rules which directly result in S (and only in 'S') are included in C. The set C is added to a stack which presently contains no other elements. Furthermore, a list of deactivated rules, "L", is created with no elements. Other initialization operations may be performed as required by a given embodiment of the present invention.

At determining operation 504, the correlation engine determines if any elements remain on the stack. If not, processing proceeds to adding operation 522, which will finalize the algorithm. If at least one element remains, processing continues with popping operation 506. It is noted that the loop beginning with popping operation 506 will execute at least once, as receiving operation 502 initializes the stack with one element.

At popping operation 506, an element is popped from the stack. This element shall be referred to as C for the remainder of the loop. It is noted that elements of the stack represent sets of rules. After popping operation 506 is completed, control passes to determining operation 508.

At determining operation 508, the correlation engine determines whether any rules remain in C. If no rules remain, processing returns to determining operation 504.

If at least one rule remains in C, at selecting operation 510, the correlation engine selects one of the remaining rules from C. The selected rule will be referred to as "R". Once selecting operation 510 is completed, control passes to determining operation 512.

At determining operation 512, the correlation engine determines whether the rule R is an end rule. If R is not an end rule, processing proceeds to step 516. If R is in fact an end rule, processing continues with step 514.

At determining operation 514, the correlation engine determines whether triggering the end rule R results in the correlated event set S. If it does not, processing returns to determining operation 508. If it does, processing proceeds to deactivating operation 518.

At determining operation 516, the correlation engine determines whether triggering R, which is not an end rule, can only invoke the rule "$R_{prime}$"—$R_{prime}$ is defined in step 520. It is noted that this operation will only occur on the second and subsequent iterations through the loop, as the first iteration concerns only the end rules.

At deactivating operation 518, the correlation engine deactivates the rule R. It adds R to the list L of deactivated rules.

At assigning operation 520, the present rule R is defined as "$R_{prime}$" The correlation engine determines which rules may trigger $R_{prime}$. Any such rules are added to a new set, "C", which is pushed onto the stack. This will cause this set to be recursively processed via the present method. After doing so, processing returns to determining operation 508.

When the stack is empty, processing finishes with adding operation 522. The correlation engine creates a new rule, "$R_{activate}$", and adds it to the ruleset. The list of deactivated rules, L, is incorporated into $R_{activate}$. $R_{activate}$ may be configured to trigger upon receiving the event $E_{fix}$ as specified in returning operation 416 of FIG. 4. When $R_{activate}$ is triggered, all the rules listed in L are activated once again.

Figure 6:
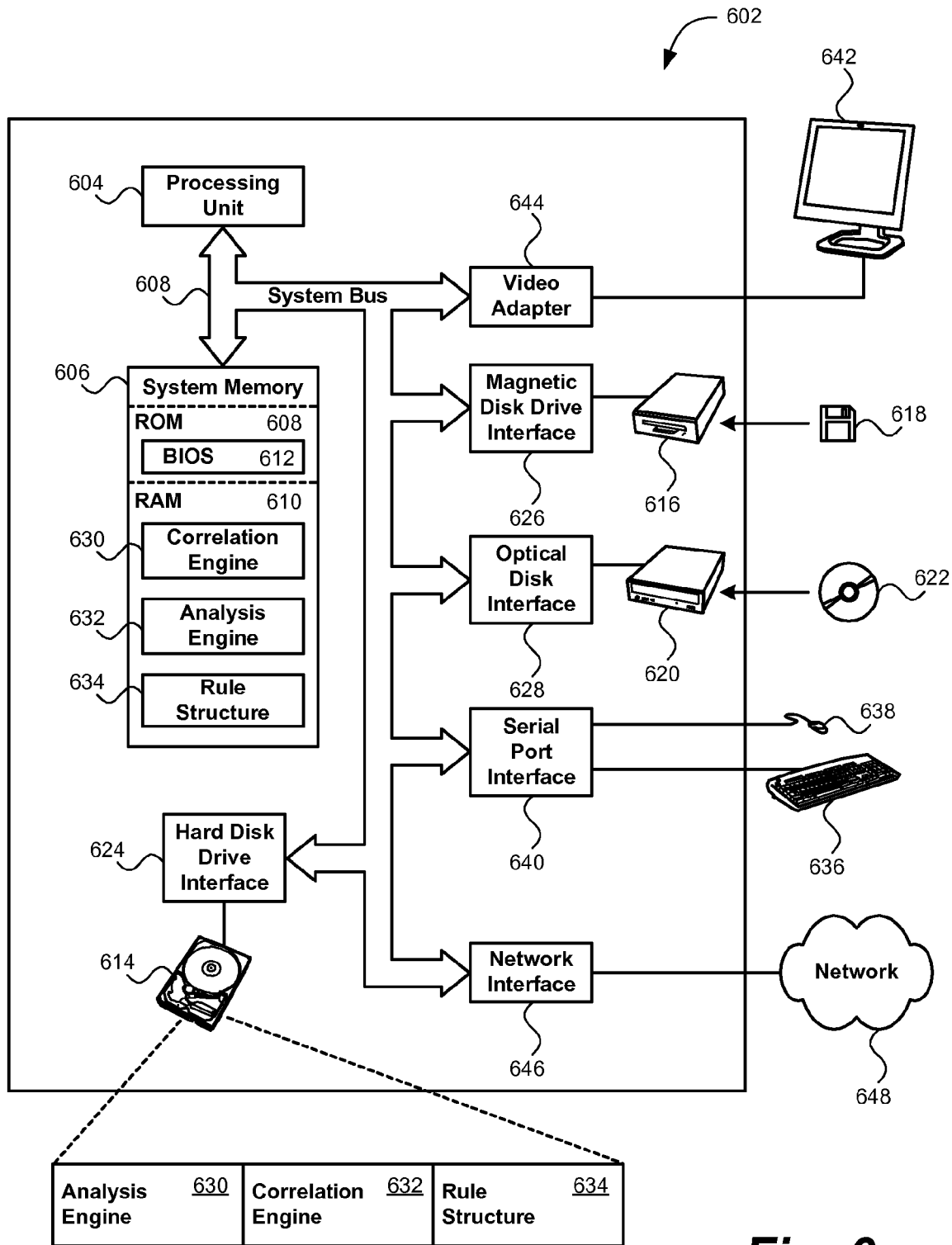
FIG. 6 shows an illustrative embodiment of a computer system in accordance with the present invention.

With reference to FIG. 6, an illustrative embodiment of a computer system 602 in accordance with the present invention is shown. One computer system 602 in which the present invention is potentially useful encompasses a general-purpose computer. Examples of such computers include SPARC® systems offered by Sun Microsystems, Inc. and Pentium® based computers available from International Business Machines Corp. and various other computer manufacturers. SPARC is a registered trademark of Sun Microsystems, Inc. and Pentium is a registered trademark of Intel Corporation.

The computer system 602 includes a processing unit 604, a system memory 606, and a system bus 608 that couples the system memory 606 to the processing unit 604. The system memory 606 includes read only memory (ROM) 608 and random access memory (RAM) 610. A basic input/output system (BIOS) 612, containing the basic routines that help to transfer information between elements within the computer 602, such as during start-up, is stored in ROM 608.

The computer system 602 further includes a hard disk drive 614, a magnetic disk drive 616 (to read from and write to a removable magnetic disk 618), and an optical disk drive 620 (for reading a CD-ROM disk 622 or to read from and write to other optical media). The hard disk drive 614, magnetic disk drive 616, and optical disk drive 620 are connected to the system bus 608 by a hard disk interface 624, a magnetic disk interface 626, and an optical disk interface 628, respectively. The drives and their associated computer-readable media provide nonvolatile storage for the computer system 602. Although computer-readable media refers to a hard disk, removable magnetic media and removable optical media, it should be appreciated by those skilled in the art that other types of media that are readable by a computer, such as flash memory cards, may also be used in the illustrative computer system 602.

A number of program modules may be stored in the drives and RAM 610, including a correlation engine 630, an analysis engine 632, a rule data structure utilized by the correlation engine 634, and other program modules and data (not shown). As discussed above, the computer system 602 is configured to ignore redundant symptoms of fault conditions after corrective action has been initiated.

A user may enter commands and information into the computer system 602 through a keyboard 636 and pointing device, such as a mouse 638. Other input devices (not shown) may include a microphone, modem, joystick, game pad, satellite dish, scanner, or the like. These and other input devices are often connected to the processing unit through a serial port interface 640 that is coupled to the system bus 608.

A display device 642 is also connected to the system bus 608 via an interface, such as a video adapter 644. In addition to the display device, the computer system 602 may include other peripheral output devices (not shown), such as speakers and printers.

The computer system 602 operates in a networked environment using logical connections to one or more remote devices. The remote device may be a server, a router, a peer device or other common network node. When used in a networking environment, the computer system 602 is typically connected to the network 648 through a network interface 646. In a network environment, program modules depicted relative to the computer system 602, or portions thereof, may be stored in one or more remote memory storage devices.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A self-healing system comprising:
   an event bus configured to transmit events in the self-healing system;
   a correlation engine coupled to the event bus, the correlation engine configured to correlate events transmitted on the event bus from different components of the self-healing system, wherein the correlation engine correlates the events into a correlated event set, the correlated event set indicating a possible fault condition in the system, the correlation engine further configured to evaluate a plurality of correlation rules, the plurality of correlation rules being arranged in a hierarchal rule structure to correlate the events;
   an analysis engine coupled to the event bus, the analysis engine configured to perform analysis on the correlated event set that is received from the correlation engine, determine at least one corrective action to be performed in response to the correlated event set, and send a deactivation event to the correlation engine upon initiation of the corrective action, the deactivation event including the correlated event set; and
   wherein the correlation engine is further configured to deactivate all correlation rules within the hierarchal rule structure that are used to generate only the correlated event set, and wherein the correlation engine deactivates the correlation rules while recursively traversing the hierarchal rule structure from child rule to parent rule; and
   wherein the first, second and third program instructions are stored on the computer readable storage media for execution by the CPU via the computer readable memory.

2. The system of claim 1, wherein the analysis engine is further configured to send a reactivation event set to the correlation engine, the reactivation event set indicating at least one reactivation event required to be received by the correlation engine to reactivate the deactivated correlation rules.

3. The system of claim 1, wherein the correlation engine is further configured to create an activation rule causing the deactivated correlation rules to return to an active state.

4. The system of claim 1, further comprising:
   a system component coupled to the event bus, the system component configured to send at least one component event to the correlation engine; and
   wherein the correlation engine is further configured to disable transmission of the component event from the system component to the correlation engine upon a determination that the component event is only processed by disabled rules.

5. The system of claim 1, further comprising:
wherein the analysis engine is configured to notify the correlation engine of at least one target event which, if detected by the correlation engine, increases the likelihood of a fault condition in the system; and
wherein the correlation engine is configured to rearrange the hierarchal rule structure such that a target rule set of at least one target rule for evaluating the target event is given processing priority.

6. The system of claim 1, wherein the analysis engine is further configured to compare the correlated event set to a symptom database.

7. The system of claim 1, wherein the correlation engine is further configured to deactivate the correlation rules while recursively traversing the hierarchal rule structure from child rule to parent rule.

8. A method for processing events in a computer system, the method comprising:
receiving at least one system event, the at least one system event indicating a possible fault condition in the system;
utilizing a hierarchal rule structure to generate a correlated event set;
determining at least one corrective action to be performed in response to the correlated event set;
deactivating all correlation rules within the hierarchal rule structure that are only used to generate the correlated event set;
determining at least one target event which, if detected, increases the likelihood of a fault condition; and
rearranging the hierarchal rule structure such that a target rule set of at least one target rule for evaluating the target event is given processing priority.

9. The method of claim 8, further comprising receiving a deactivation event upon initiation of the corrective action, the deactivation event including the correlated event set.

10. The method of claim 8, further comprising receiving a reactivation event set, the reactivation event set indicating at least one reactivation event required to be received to reactivate the deactivated correlation rules.

11. The method of claim 8, further comprising creating an activation rule for causing the deactivated correlation rules to return to an active state.

12. The method of claim 8, further comprising disabling transmission of a component event from a system component upon a determination that the component event is only processed by disabled rules.

13. A method for processing events in a computer system, the method comprising:
receiving at least one system event, the at least one system event indicating a possible fault condition in the system;
utilizing a hierarchal rule structure to generate a correlated event set;
determining at least one corrective action to he performed in response to the correlated event set;
deactivating all correlation rules within the hierarchal rule structure that are only used to generate the correlated event set; and
deactivating the correlation rules while recursively traversing the hierarchal rule structure from child rule to parent rule.

14. The method of claim 13, further comprising receiving a deactivation event upon initiation of the corrective action, the deactivation event including the correlated event set.

15. The method of claim 13, further comprising receiving a reactivation event set, the reactivation event set indicating at least one reactivation event required to be received to reactivate the deactivated correlation rules.

16. The method of claim 13, further comprising creating an activation rule for causing the deactivated correlation rules to return to an active state.

17. The method of claim 13, further comprising disabling transmission of a component event from a system component upon a determination that the component event is only processed by disabled rules.

18. A computer program product for processing events in a computer system, the computer program product comprising:
a computer usable storage medium having computer usable program code embodied therewith, the computer usable program code comprising:
computer usable program code configured to receive at least one system event, the at least one system event indicating a possible fault condition in the system;
computer usable program code configured to utilize a hierarchal rule structure to generate a correlated event set;
computer usable program code configured to determine at least one corrective action to be performed in response to the correlated event set;
computer usable program code configured to deactivate all correlation rules within the hierarchal rule structure that are only used to generate the correlated event set;
computer usable program code configured to determine at least one target event which, if detected, increases the likelihood of a fault condition; and
computer usable program code configured to rearrange the hierarchal rule structure such that a target rule set of at least one target rule for evaluating the target event is given processing priority.

19. The computer program product of claim 18, further comprising computer usable program code configured to receive a deactivation event upon initiation of the corrective action, the deactivation event including the correlated event set.

20. The computer program product of claim 18, further comprising computer usable program code configured to receive a reactivation event set, the reactivation event set indicating at least one reactivation event required to be received to reactivate the deactivated correlation rules.

21. The computer program product of claim 18, further comprising computer usable program code configured to create an activation rule for causing the deactivated correlation rules to return to an active state.

22. The computer program product of claim 18, further comprising computer usable program code configured to disable transmission of a component event from a system component upon a determination that the component event is only processed by disabled rules.

23. The computer program product of claim 18, further comprising:
computer usable program code configured to determine at least one target event which, if detected, increases the likelihood of a fault condition; and
computer usable program code configured to rearrange the hierarchal rule structure such that a target rule set of at least one target rule for evaluating the target event is given processing priority.

24. The computer program product of claim 18, further comprising computer usable program code configured to deactivate the correlation rules while recursively traversing the hierarchal rule structure from child rule to parent rule.

* * * * *